Patented Oct. 4, 1938

2,132,357

UNITED STATES PATENT OFFICE 2,132,357

CARBOXYLATION OF ALKALI METAL SALTS OF PHENOLS

Hans Z. Lecher, Plainfield, and Mario Scalera, Somerville, N. J., assignors to The Calco Chemical Company, Inc., Bound Brook, N. J., a corporation of Delaware No Drawing. Application July 31, 1937, Serial No. 156,704

21 Claims. (Cl. 260—111)

This invention relates to the carboxylation of alkali metal salts of phenols both mononuclear and polynuclear. More particularly, the invention relates to the carboxylation of alkali metal salts of phenols by causing them to react with carbon dioxide.

The carboxylation of alkali metal phenolates to produce corresponding hydroxy carboxylic acids is not a new reaction. The process, which is usually referred to as the Kolbe synthesis after its discoverer, is used particularly for preparing salicylic acid and 2-hydroxy-3-naphthoic acid on industrial scale. The industrial processes essentially consist in exposing the dry alkali metal phenolates to the reaction of carbon dioxide under pressure.

A number of practical difficulties are involved in these processes. The first difficulty lies in the necessity for absolutely anhydrous conditions as the presence of any considerable amount of moisture in the alkali metal phenolate prevents carboxylation. While it is a comparatively simple matter to produce anhydrous alkali metal salts of some mononuclear phenols, such as the phenol itself, the hygroscopic alkali metal salts of betanaphthol are very sensitive and are easily oxidized when exposed to air. The carboxylation reaction is exothermic and it is difficult to regulate. The difficulty is particularly acute when the reaction mixture passes through a sticky stage and stirring becomes difficult which results in local superheating. This is especially true in the case of the carboxylation of sodium betanaphtholate where side reactions take place and cause the formation of by-products such as xanthones, and even of tar. As a result, while satisfactory yields are obtainable in the carboxylation of sodium phenolate, the yields are very low with sodium betanaphtholate and in addition to the waste of material involved, extensive purification is necessary with resulting increased cost and, in many cases, with the production of a final product of lower purity.

It has been suggested to use inert diluents such as organic liquids or molten solids which do not dissolve alkali metal salts of phenols and which do not react with the starting materials, and product or intermediate products. Such diluents facilitate the preparation of anhydrous phenolate but they have an undesirable effect on the carboxylation reaction which is greatly retarded because carbon dioxide dissolves but sparingly in the diluent and the contact of carbon dioxide with the suspended and coated phenolate particles is poor.

It has been known that such phenolates dissolve in water and in alcohols. However, these solvents are not inert in the Kolbe reaction, but prevent it by forming the alkali carbonate and the free phenol. It has been known that alkali metal phenolates dissolve in phenols and such solutions, e. g., solutions of sodium betanaphtholate in betanaphthol had been employed in the Kolbe reaction. However, such phenolic solvents are not inert because they take part in reactions and equilibria involved. As a result, huge amounts of tar are formed when 2-hydroxy-3-naphthoic acid is prepared in a solution of sodium betanaphtholate in betanaphthol.

In our copending applications, Serial No. 99,486 filed September 4, 1936 and Serial No. 139,712 filed April 29, 1937, we have disclosed a group of inert solvents for alkali metal salts of phenols which belong to a certain class of heterocyclic ethers and we have disclosed that solutions in these solvents can be advantageously used in the Kolbe reaction.

The present invention employs a new class of inert and cheap solvents which may be used for the same purpose. We do not claim in the present case the solutions of alkali metal salts of phenols as new products, nor processes for obtaining such solutions, this forming the subject matter of our copending application, Serial No. 155,922 filed July 27, 1937.

The solvents used in the present invention belong to the group of pyridine, compounds having condensed pyridine rings, and their homologs. As examples may be mentioned pyridine itself, the picolines, the lutidines, the collidines, quinoline, quinaldine, lepidine, isoquinoline, etc. Mixtures of such compounds such as those directly obtained from the acid soluble coal tar fraction may also be used and are, as a matter of fact, the cheapest solvents of this group.

It has been found that anhydrous solutions of alkali metal salts of mononuclear and polynuclear phenols in these solvents can be easily obtained and reacted with carbon dioxide. The homogeneity of the reacting solutions prevents local superheating and tar formation and assures a smooth reaction easy to control and decreases the formation of by-products such as xanthones.

The most important phenol, the alkali metal salt of which can be carboxylated according to the present invention, is betanaphthol. However, the invention is not limited to this compound but is generally usable with phenols in which there are not sufficient polar groups to render their alkali metal salts insoluble in the solvents of the present invention. Examples of such other phenols are phenol, the cresols, the chloro-phenols, alpha-naphthol, hydroxy-anthracenes, 5,6,7,8-tetrahydro-2-naphthol, p-benzyl-phenol, hydroxy-carbazoles, and hydroxy-benzo-carbazoles.

The solubility of the alkali salts of all these phenols is, of course, not the same in any one of the solvents of the present invention and the solubility of any given alkali salt in different solvents will obviously also vary. In many cases the solubility at lower temperatures is not sufficient and solutions must be prepared at higher temperatures. In some cases this necessitates using some of the higher boiling heterocyclic solvents of the present invention, in which case, of course, the solvents best suited for the particular conditions will be chosen.

The solutions to be used in the present invention may be prepared in many ways which are disclosed in our copending application, Serial No. 155,922 filed July 27, 1937 where methods of dehydrating such solutions are also described.

Obviously the phenolate solutions to be used in the present invention must be thoroughly dehydrated. When the dry phenolate solutions are reacted with carbon dioxide at ordinary or slightly elevated temperature, the alkali metal salt of the carbonic ester forms first:

(a)     $R—OM + CO_2 \rightleftarrows R—O—CO_2M$ (R=aromatic radical,
M=alkali metal)

These salts are very soluble in the relating solvents, much more than the corresponding phenol salts. This reaction is reversible.

However, there is another manner in which the phenolates react with carbon dioxide, very probably because of a tautomeric equilibrium:

(b) 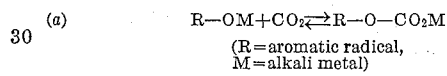

(c) 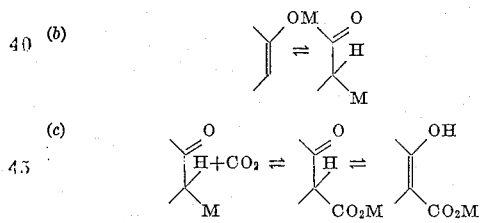

Whatever the explanation might be, by this other reaction sodium salts of hydroxycarboxylic acids are formed. These sodium salts are almost insoluble in the solvents used, precipitate and are thus removed from the equilibrium. Therefore, the salt of the carbonic ester gradually disappears and is replaced by the salt of the hydroxycarboxylic acid.

The optimum conditions for this carboxylation vary with the phenol and the solvent used. In some cases, e. g., in the formation of 2-hydroxy-1-naphthoic acid, the carboxylation takes place smoothly even at room temperature. In other cases, an elevated temperature is required. If the relating carboxylation is effected at lower temperature, carbon dioxide may be passed through the solution at atmospheric pressure. If a higher temperature is required, carbon dioxide must be applied under pressure in order to increase its solubility in the solvent. It is evident from the equations given above that the rate of reaction is increased by increasing the concentration of both reagents.

In some cases, particularly in the carboxylation of betanaphtholate, two isomeric acids may be formed. The salt of the valuable 2-hydroxy-3-naphthoic acid is only formed at a high temperature above 200° C., preferably at about 230° C. to 270° C. When the carboxylation is started at low temperature, the salt of the 2—1 isomer forms first; on heating it is decomposed because the reaction (d) 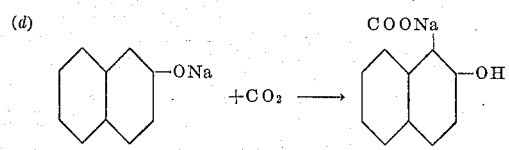

is reversible. The sodium betanaphtholate then fixes $CO_2$ at higher temperature in 3-position:

(e) 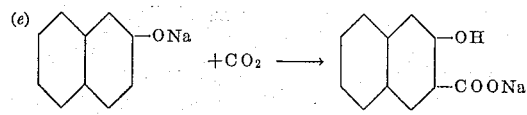

However, it is preferable to introduce carbon dioxide only at high temperature, e. g. at 230° C. to 270° C., and to raise the pressure only slowly and not too high in order to avoid as far as possible the intermediate formation of the 2—1 isomer. For this latter isomer tends to form a naphthoxanthone

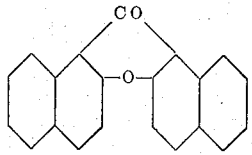

and also some tarry by-products which both are undesired in the manufacture of the 2,3-isomer. It is one of the advantages of this new process for making 2-hydroxy-3-naphthoic acid that the carbon dioxide may be reacted only at 250° C., which could not be successfully done with solid sodium betanaphtholate because of a too violent reaction.

As mentioned above, the use of betanaphthol as solvent for sodium betanaphtholate in making 2-hydroxy-3-naphthoic acid had been known to the prior art, but it causes the formation of very much tarry by-products. However, the presence of some free betanaphthol in the starting solution of sodium betanaphtholate has a very favorable effect upon the yield on this acid, probably because it shifts the equilibrium:

(f) 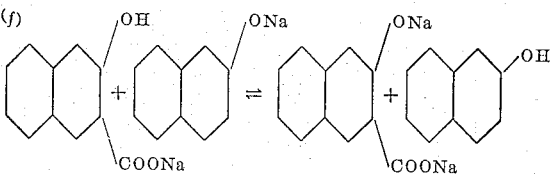

to the left side. A ratio of 1 part of free betanaphthol to 3 parts of pyridine is particularly favorable, but this ratio may be varied up to 1:1.

The material of the autoclave is likewise important. Iron is not only corroded but the iron compounds formed increase tremendously the formation of naphthoxanthone. Nickel and various nickel alloys are suitable materials.

The process of the present invention presents a number of important advantages, particularly for the commercial production of hydroxypolynuclear carboxylic acids such as hydroxynaphthoic acids. The first advantage is that carboxylation can be readily regulated and no difficulties are encountered resulting from local superheating or inadequate stirring. A second important advantage is the prevention or great reduction in the formation of by-products such as, xanthones or tar. As a result, hydroxycarboxylic acids can be obtained in higher purity and with better yields. Thus, for example, when preparing 2- hydroxy-3-naphthoic acid, the ratio of acid obtained to nonusable by-products (naphthoxanthone, tar, etc.) is increased from 3:1 to 6:1.

The above advantages are applicable to all of the modifications of the present invention regardless of whether the alkali metal phenolate is used ready formed or whether it is produced and dehydrated in the solvent which then becomes the reaction mixture. In addition to these general advantages, the preferred modification of the present invention, in which the alkali metal phenolate is produced by reaction between the phenol and alkali in the solvent, possesses the further advantage that the expensive and difficult step of isolating the anhydrous alkali metal phenolate is eliminated which, of course, reduces the cost of the process by eliminating one of the troublesome steps which had hitherto been considered necessary by the art.

The invention will be described in greater detail in connection with the following specific examples which illustrate the typical embodiment of the invention, it being understood, of course, that the invention is not limited to the details set forth in the specific examples. The parts are parts by weight.

*Example 1*

Fifty-eight parts by weight of alpha naphthol are dissolved in 200 parts of pyridine, and 16 parts by weight of caustic soda are added. The mixture is stirred until all the caustic has dissolved (about 1 hour). The water formed is removed by an azeotropic distillation of pyridine and water, the solvent being gradually replaced, as it boils off, by dry pyridine. When the boiling point of the distilling vapors reaches 115.2°–115.5° C. it ceases to rise; the solution is then substantially anhydrous and clear.

Into this warm solution is passed a stream of dry carbon dioxide at atmospheric pressure, and the solution is allowed to cool in the current of gas. Almost immediately a white precipitate of the sodium salt of 1-hydroxy-2-naphthoic acid appears. When the solution is saturated with carbon dioxide it is pasty with this precipitate.

It is filtered, pressed dry, the cake washed with a little dry pyridine and dried. The white powder so obtained is the pure sodium salt of 1-hydroxy-2-naphthoic acid, and the acid can be prepared from it by dissolution in water and precipitation with acid. The pyridine filtrate contains a small amount of the acid and a little unchanged alphanaphthol; it can be reused directly in another batch after the addition of the needed amounts of naphthol and caustic or the pyridine can be recovered by distillation.

No by-products are formed and the yield is almost quantitative. The pyridine may be dried satisfactorily by refluxing it over quicklime.

*Example 2*

Fifty parts by weight of 5,6,7,8-tetrahydro-2-naphthol are dissolved in 200 parts by weight of pyridine, and, while stirring, 13.3 parts by weight of sodium hydroxide are added. The solution is stirred until all of the sodium hydroxide goes into solution (about 1 hour) and it is then heated to a boil. The pyridine water mixture begins to distill at 93° C. and the boiling point of the distilling vapors rises until it remains constant at 115.2°–115.5° C. The wet solvent distilling over is gradually replaced by dry pyridine, and when the dehydration is completed, 150 parts by weight of dry pyridine are left in the flask.

This clear anhydrous solution is heated in an autoclave up to 160° C. and then subjected to a partial pressure of 60–100 pounds/sq. in. carbon dioxide for 7–8 hours; the autoclave is then allowed to cool. The sodium salt of the 5, 6, 7, 8-tetrahydro-2-hydroxy-3-naphthoic acid is insoluble in pyridine in the cold, appearing as a white precipitate. The acid and the unchanged naphthol are separated in the usual manner.

*Example 3*

Eighty three parts by weight of betanaphthol (25 parts being in excess) are dissolved in 200 parts by weight of quinoline, and 16 parts by weight of caustic soda are added. The mixture is warmed, with stirring, until all of the caustic has dissolved, then it is heated to boiling. The water boils over first, at 100° C.; then the boiling temperature of the distilling vapors rises very rapidly to 232° C., and more slowly to 234° C. where it remains constant. Fifty parts by weight of quinoline are then distilled to wash down all traces of water vapor from the walls and tubes.

The clear solution, thus dehydrated, is heated to 250° C. in an autoclave. Carbon dioxide is introduced with agitation under pressure, raising its partial pressure from 30 to 100 lbs./sq. in. over an eight hour period. The autoclave is then allowed to cool, and the charge removed. The quinoline is best removed from the charge by drowning it in aqueous alkali and extracting with benzene or naphtha. The aqueous layer contains 2-hydroxy-3-naphthoic acid and unchanged betanaphthol which can be separated by the usual methods.

*Example 4*

Fifty-eight parts by weight of betanaphthol are dissolved in 200 parts by weight of pyridine and 22.4 parts by weight of potassium hydroxide are added. The mixture is stirred, warming to 40°–50° C., until clear. Then it is heated to boiling, and the wet pyridine distilled off, and gradually replaced by dry pyridine. When the boiling point of the distillate remains constant at the boiling point of pure pyridine (115.2° C.–115.5° C.) the solution is treated with $CO_2$ at atmospheric pressure, and at a temperature of 50°–60° C., until saturated, cooling finally in an atmosphere of the gas, with constant agitation. The solution becomes pasty with a white precipitate which is then filtered out, pressed dry, washed with a little pyridine. This precipitate, dried to a white powder, is the pure potassium salt of 2-hydroxy-1-naphthoic acid, and the acid can be obtained from it by dissolution in water and precipitation with acid. The pyridine mother liquor may be used in a second batch, or distilled.

*Example 5*

One hundred and sixty-five parts by weight of beta-naphthol (50 parts being an excess) are dissolved in 200 parts of pyridine, and, after complete dissolution, 32 parts of sodium hydroxide are added with stirring. Stirring is continued until a clear solution is obtained; then the solution is heated to boiling, and the pyridine-water homoazeotrope is distilled off. The boiling point of the distillate slowly rises from 90°–95° up to 115.2°–115.5° C. where it remains constant, indicating that all the water has been removed. The wet solvent is gradually replaced by dry pyridine (dried over lime) as it distills off. In the clear, dehydrated solution 150 parts by weight of pyridine were left with the beta naphthol and naphtholate.

This solution is then heated to 250° C. in an autoclave furnished with an agitator. This operation is best carried out in a nickel or nickel-clad vessel. When the temperature reaches 250° C., $CO_2$ is introduced under pressure. The partial pressure of $CO_2$ is raised from 30 to 80 pounds over a period of 8–10 hours, with agitation of the solution; then the autoclave is cooled. The pyridine is distilled off and thus recovered; the remaining charge, liquid above 120° C., is drowned in dilute sodium hydroxide, the insoluble by-products (naphthoxanthones) are filtered off, and from the solution-containing only the sodium salts of beta naphthol and 2-hydroxy-3-naphthoic acid—the desired acid is isolated in a chemically pure state by the usual methods.

*Example 6*

One hundred and sixty-five parts by weight of beta-naphthol (50 parts being an excess) are dissolved, by means of a little warming, in 250 parts of an acid soluble coal tar oil of a boiling point 250°–300° C. To this clear solution 32 parts by weight of sodium hydroxide are added, preferably in powder form, and the mixture stirred at 40° C.–50° C. until the caustic has dissolved.

The solution, clear orange in color, is boiled, and the water formed by the reaction distills off. Fifty parts of the solvent are removed by distillation to insure complete dehydration and concentrate the solution further. This clear solution is then subjected to the action of $CO_2$ for 10–15 hours at atmospheric pressure and at a temperature of 250° C. The sodium salt of 2-hydroxy-3-naphthoic acid precipitates out.

The yield may be improved by working under a partial pressure of 30–80 pounds sq. in. carbon dioxide over a period of 8–10 hours.

The solvent is then removed from the cooled charge by crowning in aqueous alkali and extracting with benzene or other organic solvents; the aqueous solution gives the 2-hydroxy-3-naphthoic acid and the unchanged naphthol by the usual methods of recovery.

We claim:

1. A method of carboxylating alkali metal salts of phenols which comprises subjecting to the action of carbon dioxide a substantially anhydrous solution of an alkali metal phenolate in a solvent having a major component belonging to the group consisting of pyridine, compounds containing condensed pyridine rings, and their homologs.

2. A method of carboxylating alkali metal salts of phenols which comprises subjecting to the action of carbon dioxide a substantially anhydrous solution of an alkali metal phenolate in a solvent containing pyridine as a major component.

3. A method of carboxylating alkali metal salts of phenols which comprises subjecting to the action of carbon dioxide a substantially anhydrous solution of an alkali metal phenolate in a solvent containing a mixture of acid soluble coal tar bases as major component.

4. A method of carboxylating alkali metal salts of phenols which comprises dissolving the phenol in a solvent having a major component belonging to the group consisting of pyridine, compounds containing condensed pyridine rings, and their homologs, reacting this phenol solution with an alkali to produce an alkali metal salt of the phenol in solution, dehydrating the solution and subjecting the solution, without isolation of the alkali metal phenolate, to the action of carbon dioxide.

5. A method of carboxylating alkali metal salts of phenols which comprises dissolving the phenol in a solvent containing pyridine as a major component, reacting the phenol solution with an alkali to produce an alkali metal salt of the phenol in solution, dehydrating the solution, and subjecting the solution, without isolation of the alkali metal phenolate, to the action of carbon dioxide.

6. A method of carboxylating alkali metal salts of phenols which comprises dissolving the phenol in a solvent containing an acid soluble mixture of coal tar bases as major component, reacting the phenol solution with an alkali to produce an alkali metal salt of the phenol in solution, dehydrating the solution, and subjecting the solution, without isolation of the alkali metal phenolate, to the action of carbon dioxide.

7. A method of carboxylating alkali metal betanaphtholates which comprises subjecting to the action of carbon dioxide a substantially anhydrous solution of an alkali metal betanaphtholate in a solvent having a major component belonging to the group consisting of pyridine, compounds containing condensed pyridine rings, and their homologs.

8. A method of carboxylating alkali metal betanaphtholates which comprises subjecting to the action of carbon dioxide a substantially anhydrous solution of an alkali metal betanaphtholate in a solvent having pyridine as a major component.

9. A method of carboxylating alkali metal betanaphtholates which comprises subjecting to the action of carbon dioxide a substantially anhydrous solution of an alkali metal betanaphtholate in a solvent containing a mixture of acid soluble coal tar bases as a major component.

10. A method of carboxylating alkali metal betanaphtholates which comprises dissolving betanaphthol in a solvent containing pyridine as a major component, reacting the betanaphthol with an alkali to form the alkali metal betanaphtholate in solution, dehydrating the solution and subjecting the solution, without isolation of the alkali metal betanaphtholate, to the action of carbon dioxide.

11. A method of carboxylating alkali metal betanaphtholates which comprises dissolving betanaphthol in a solvent containing a mixture of acid soluble coal tar bases as a major component, reacting the betanaphthol with an alkali to form the alkali metal betanaphtholate in solution, dehydrating the solution and subjecting the solution, without isolation of the alkali metal betanaphtholate, to the action of carbon dioxide.

12. A method of carboxylating alkali metal betanaphtholates which comprises subjecting to the action of carbon dioxide at a temperature from 230°–270° C. a substantially anhydrous solution of an alkali metal betanaphtholate in a solvent containing pyridine as a major component.

13. A method of carboxylating alkali metal betanaphtholates which comprises subjecting to the action of carbon dioxide at a temperature from 230°–270° C. a substantially anhydrous solution of an alkali metal betanaphtholate in a solvent containing a mixture of acid soluble coal tar bases as a major component.

14. A method according to claim 12 in which the solvent contains free betanaphthol in addition to pyridine.

15. A method according to claim 13 in which the solvent contains free betanaphthol in addition to the mixture of acid soluble coal tar bases.

16. A method according to claim 12 in which the solvent contains in addition to pyridine, from 15–35% of betanaphthol.

17. A method according to claim 13 in which the solvent contains in addition to the mixture of acid soluble coal tar bases, from 15–35% of betanaphthol.

18. A method according to claim 12 in which the solution of the alkali metal betanaphtholate is heated to a reaction temperature of 230°–270° C. in the absence of carbon dioxide and carbon dioxide is then introduced while maintaining the reaction mixture at the reaction temperature.

19. A method according to claim 13 in which the solution of an alkali metal betanaphtholate is heated to a reaction temperature of 230°–270° C. in the absence of carbon dioxide and carbon dioxide is then introduced while maintaining the reaction mixture at the reaction temperature.

20. A method according to claim 1 in which the reaction takes place out of contact with iron compounds.

21. A method according to claim 1 in which the reaction takes place in the absence of iron compounds and in an equipment having a nickel-containing surface exposed to the reaction mixture.

HANS Z. LECHER.
MARIO SCALERA.